Dec. 28, 1954  V. L. GRAVES  2,698,117
MULTIPLE SECTION FISH STRINGER
Filed Nov. 14, 1951  2 Sheets-Sheet 1
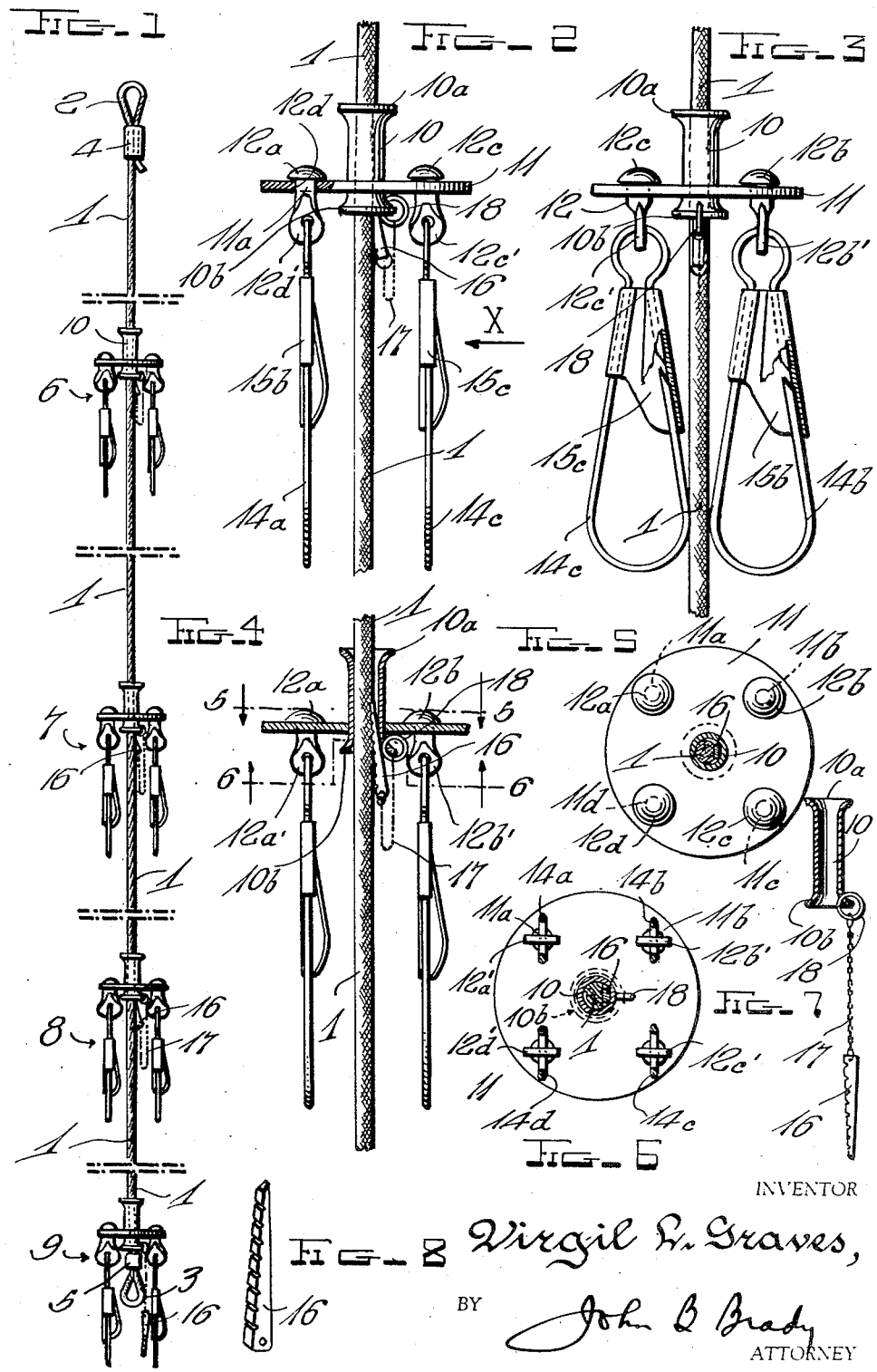
INVENTOR
Virgil L. Graves,
BY John B. Brady
ATTORNEY

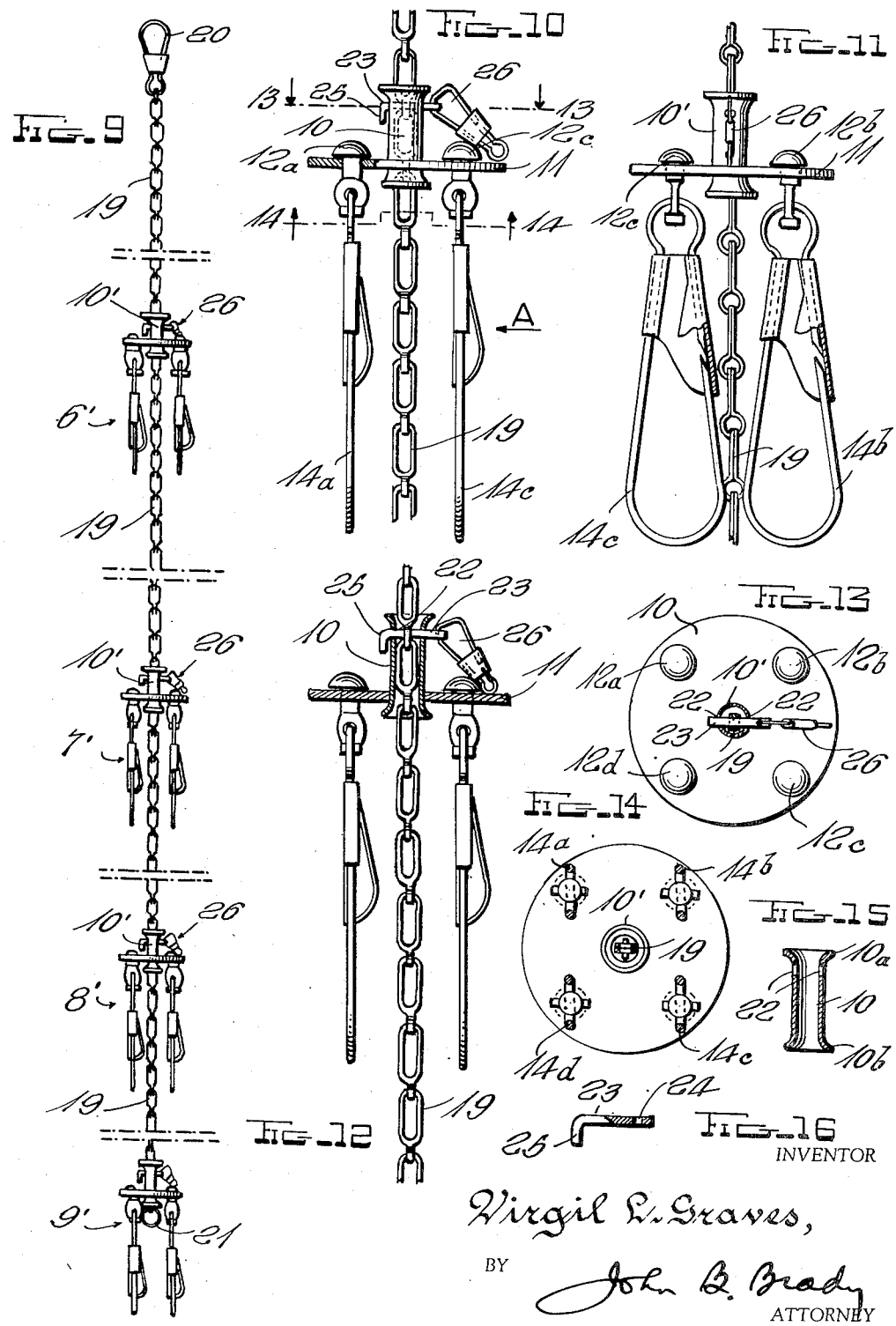

United States Patent Office 2,698,117
Patented Dec. 28, 1954

2,698,117

MULTIPLE SECTION FISH STRINGER

Virgil Liston Graves, Monroe, La., assignor of one-half to Emco Inc., Monroe, La., a corporation of Louisiana Application November 14, 1951, Serial No. 256,308

3 Claims. (Cl. 224—7)

My invention relates broadly to fish stringers and more particularly to a multiple section fish stringer which may be readily submerged under water for confining the fish and which may be readily withdrawn and carried.

One of the objects of my invention is to provide a construction of fish stringer formed in a plurality of spaced sections for confining a multiplicity of fish under water and wherein each section of the fish stringer includes a revolvable disc to which loops to which the fish are fastened are swiveled, permitting movement of the fish around the stringer while confining the fish in a multiplicity of different levels below the water.

Another object of my invention is to provide a multiple section fish stringer in which the sections are separated by differing distances from each other along a central supporting member for enabling fish of differing sizes to be classified and confined in the different sections of the fish stringer for distributing the fish of uniform size to selected sections of the fish stringer thereby assorting the fish as to size as they are caught.

Still another object of my invention is to provide a multiple section fish stringer having means for positively spacing the sections one from another along an interconnecting member and allowing rotation of the sections, enabling fish confined in each of the sections to continue to swim in an orbit without interference between the sections at different levels.

Still a further object of my invention is to provide a multiple section fish stringer including a central supporting means and means associated with each of the multiplicity of sections for adjustably positioning the sections along the central supporting means.

Other and further objects of my invention is to provide a construction of multiple section fish stringer including a multiplicity of adjustable revolvable discs which swivelly support a multiplicity of fish stringers as set forth more fully in the specification hereinafter following by reference to the accompanying drawings, in which:

Figure 1 is an elevational view showing one form of fish stringer of my invention and illustrating the multiple sections thereof adjustably supported at different levels for confining fish below the surface of the water while providing freedom of movement for the fish around the central supporting means; Fig. 2 is an enlarged side elevational view of one of the sections of the fish stringer shown in Fig. 1 with part of the revolvable disc broken away and illustrated in section; Fig. 3 is an elevational view looking in the direction of arrow X in Fig. 2 with certain of the parts of the fish engaging loops broken away and illustrated in section; Fig. 4 is a vertical sectional view taken through the revolvable disc of the fish stringer and illustrating particularly the means for selectively positioning the fish stringer section in a predetermined position along the central confining member; Fig. 5 is a horizontal sectional view taken substantially on line 5—5 of Fig. 4; Fig. 6 is a horizontal sectional view taken substantially on line 6—6 of Fig. 4; Fig. 7 is a vertical sectional view taken through the tubular member which surrounds the central confining member and illustrating the wedge which is flexibly connected thereto; Fig. 8 is a perspective view of the wedge employed in the form of my invention shown in Figs. 1–7; Fig. 9 is an elevational view of a modified form of multiple section fish stringer embodying my invention; Fig. 10 is an enlarged elevational view of one of the sections of the fish stringer shown in Fig. 9; Fig. 11 is a front elevational view of the section of the fish stringer illustrated in Fig. 10 looking in the direction of arrow A; Fig. 12 is a vertical sectional view taken through one of the sections of the fish stringer illustrated in Figs. 9–11 and showing the disc and the tubular member which supports the disc with respect to the central confining member in vertical section; Fig. 13 is a horizontal sectional view taken substantially on line 13—13 of Fig. 10; Fig. 14 is a horizontal sectional view taken substantially on line 14—14 of Fig. 10; Fig. 15 is a vertical sectional view through one of the tubular members which is slidably disposed over the central member of the fish stringer; and Fig. 16 is an elevational view of one of the keys which I provide for adjustably interlocking the tubular member of Fig. 15 with the central supporting member of the multiple section fish stringer, the key being partially broken away and shown in section.

My invention is directed to a very practical construction of a multiple section fish stringer which may be manufactured inexpensively on a mass production scale for producing a reliable form of fish stringer which may be readily supported over the gunwale of a boat or at a wharf for confining fish as they are caught while allowing the fish to swim in limited orbits about the confining means. The fish stringer of my invention includes a multiplicity of stages or spaced sections which are adjustably located along the central confining means of the fish stringer. The separate sections of the fish stringer at different levels each include a revolvable disc in which loop members are swivelled. The loop members are individually displaced to engage fish which may be strung thereon and allowed limited movement about the confining means while submerged in water. The revolvable discs of each of the sections may be located at different spaced positions along the confining means for permitting fish of different sizes to be classified as they are caught and located along the fish stringer with fish of substantially the same size so that when the catch is completed the fish of substantially uniform size are already grouped together at the different levels of the multiple section fish stringer. I provide an arrangement of a wedging device for adjustably positioning the different sections of the fish stringer along the supporting means where the supporting means has the form of a cable or rope whereas in cases where the supporting means has the form of a chain the locking means is in the form of a transverse pin which extends through a component of the fish stringer section and through one of the loops of the supporting chain. The forms of my invention shown herein have been found particularly effective and reliable in operation, but I realize that other modifications may be made, and I desire that the disclosure of my invention as set forth herein be considered in the illustrating sense, and not in the limiting sense.

Referring to the drawings in more detail, reference character 1 designates a central supporting member which may be a flexible wire cable or a rope provided with a connecting loop 2 at the top thereof and terminating in a loop 3 at the end thereof. The lops 2 and 3 are seized to the central supporting member at 4 and 5. The several sections of the fish stringer are distributed along the central supporting member 1 at different levels as I have represented at 6, 7, 8 and 9. Each section of the fish stringer includes a tubular member 10 which is flared outwardly at each end thereof to provide flanges 10a and 10b. The tubular member 10 serves as a bearing support for the revolvable disc 11. The revolvable disc 11 is symmetrically apertured adjacent the periphery thereof as represented at 11a, 11b, 11c and 11d. In the particular embodiment of my invention illustrated herein I have shown the disc 11 apertured in each quadrant so that the apertures extend on diametric lines displaced 180° from each other with the apertures separated peripherally for a distance of 90° relative to each other. I provide headed swivel members 12a, 12b, 12c and 12d extending revolvably through the apertures 11a, 11b, 11c and 11d. The headed swivel members 12a, 12b, 12c and 12d are each provided with flattened depending extremities 12a', 12b', 12c' and 12d' which are apertured transversely for the passage of the engaging ends of loops 14a, 14b, 14c and 14d. The loops have upper and lower latchable positions normally confined by plate members represented at 15b, 15c and 15d. The upper latchable positions when released from the plate members may be threaded through the flattened apertured ends of the headed swivel members while the lower latchable positions are disengageable from and engageable with the plate members 15c, 15b, 15d, etc. to permit a fish to be hooked over the loop and confined when the end of the loop is again latched with respect to the associated plate member.

The entire section of the fish stringer may be moved to a selected position along the central supporting member 1 and then the wedge member 16 inserted between the tubular member 10 and the central supporting member 1 for selectively fixing the section of the fish stringer in a particular position along the central supporting member 1. The wedge 16 is retained against loss by a confining chain 17 fastened by ring member 18 in the outwardly flared flange 10b of tubular member 10.

The stage or section of the fish stringer already described is duplicated in the positions 7, 8 and 9 etc. along the central supporting member 1. These sections are sufficiently spaced to provide for the classification of the catch according to size of the fish.

In lieu of the construction of the central supporting member 1 from a cable or rope, I may construct the central supporting member 1 in the form of a chain 19 illustrated in Figs. 9–16. In this arrangement a supporting loop 20 is provided at the upper end of chain 19 and a limiting loop 21 is provided at the lower terminus of chain 19. The sections or stages of the fish stringers are selectively located along the chain 19 by providing slidably tubular member 10' of slightly modified construction from that illustrated at 10 in the form of my invention shown in Figs. 1—8. This tubular member 10' is diametrically apertured adjacent the upper end thereof as represented at 22. A key 23 having an aperture 24 formed in one end thereof and a depending handle member formed on the other end thereof is arranged to be passed transversely through the apertures 22 in the wall of tubular member 10' and through a selected loop of the chain 19 whereby tubular member 10' is located in a predetermined position along the chain 19. After the key 23 has been passed through the apertures 22 in tubular member 10' and through a selected loop in chain 19, it is confined in position by means of a latchable loop device 26 which is passed through apertures 24 in the key 23 for maintaining the key 23 in position.

The other components of the sections or stages of the fish stringer are similar to the components described in connection with the form of my invention illustrated in Figs. 1—8. The sections or stages are distributed along the chain 19 as represented in Fig. 9 at 6', 7', 8' and 9' similar to the arrangement illustrated in Fig. 1.

I have found the forms of my invention as illustrated herein highly practical and efficient in operation and while I have described my invention in certain preferred embodiments, I realize that modifications may be made and I desire that it be understood that no limitations upon my invention are intended other than may be imposed by the scope of the appended claims.

What I claim as new and desire to secure by Letters Patent of the United States, is as follows:

1. A fish stringer comprising in combination a suspension member, a tubular member concentrically surrounding said suspension member, means engageable with both said tubular member and said suspension member for fixing said tubular member in a selected position on said suspension member, a revolvable disc carried by said tubular member and movable linearly thereof, a multiplicity of rotatable members carried by said revolvable disc and a fish supporting loop pivotally mounted in each of said rotatable members, said means for fixing the tubular member with respect to said suspension member consisting of a wedge selectively insertable between the interior wall of said tubular member and one side of the suspension member for establishing frictional contact with both the interior wall of said tubular member and said suspension member for maintaining said disc in a predetermined range of positions.

2. In a fish stringer comprising in combination, a suspension member, a tubular member concentrically surrounding said suspension member, means engageable with both said tubular member and said suspension member for fixing said tubular member in a selected position on said suspension member, a revolvable disc carried by said tubular member and movable linearly thereof, limiting means on opposite ends of said tubular member for restricting the linear movement of said disc, a multiplicity of rotatable members carried by said revolvable disc and a fish supporting loop pivotally mounted in each of said rotatable members, said means for fixing said tubular member in a selected position on said suspension member consisting of a wedge flexibly connected with one end of said tubular member and selectively insertable through one end of the tubular member intermediate the interior wall of the tubular member and one side of said suspension member for establishing frictional contact with both the interior wall of said tubular member and said suspension member for maintaining said tubular member and the revolvable disc carried thereby in a selected position on the suspension member.

3. A fish stringer comprising in combination with a suspension member, a cylindrical tubular member through which said suspension member extends, said cylindrical tubular member having an outwardly extending flange on each end thereof, a horizontally extending revolvable disc carried by said cylindrical tubular member and linearly movable thereon within limits defined by said flanges as limits, a multiplicity of spaced rotatable members carried by said disc, fish supporting loops pivotally mounted in each of said rotatable members, a flexible connection extending from one of the outwardly extending flanges of said cylindrical tubular member and connected with a wedge-shaped member on the end thereof, said wedge-shaped member being selectively insertable between the interior wall of said tubular member and one side of said suspension member for establishing frictional contact with both the interior wall of said tubular member and said suspension member for selectively fixing said tubular member in an adjusted position on said suspension member for maintaining said disc in a predetermined range of positions.

References Cited in the file of this patent

UNITED STATES PATENTS

| Number | Name | Date |
|---|---|---|
| 327,627 | Webb | Oct. 6, 1885 |
| 878,626 | Guilford | Feb. 11, 1908 |
| 904,863 | Glass et al. | Nov. 24, 1908 |
| 1,407,221 | Reimers | Feb. 21, 1922 |
| 1,713,779 | Overton | May 21, 1929 |
| 2,297,623 | Hickman | Sept. 29, 1942 |
| 2,397,968 | Lind | Apr. 9, 1946 |
| 2,473,348 | Sharps | June 14, 1949 |

FOREIGN PATENTS

| Number | Country | Date |
|---|---|---|
| 265,276 | Switzerland | Mar. 1, 1950 |